United States Patent [19]
Ivester

[11] 3,940,774
[45] Feb. 24, 1976

[54] OPAQUE SHADE

[75] Inventor: Andrew S. Ivester, Charlestown, Mass.

[73] Assignee: Polaroid Corporation, Cambridge, Mass.

[22] Filed: May 2, 1974

[21] Appl. No.: 466,371

[52] U.S. Cl. .................................. 354/83; 354/86
[51] Int. Cl.² ...................................... G03B 17/50
[58] Field of Search ....... 354/83, 86, 174, 176, 180, 354/181, 186, 301, 304

[56] References Cited
UNITED STATES PATENTS

| | | | |
|---|---|---|---|
| 625,379 | 5/1899 | Carns | 354/186 |
| 641,268 | 1/1900 | Chase | 354/186 |
| 3,537,370 | 11/1970 | Wareham | 354/86 |
| 3,748,990 | 7/1973 | Erlichman | 354/186 |

FOREIGN PATENTS OR APPLICATIONS

| 12,119 | 6/1895 | United Kingdom | 354/176 |
|---|---|---|---|

Primary Examiner—Richard M. Sheer
Attorney, Agent, or Firm—Alfred E. Corrigan

[57] ABSTRACT

Photographic apparatus for use with film units of the self-developing type including at least one photosensitive layer and a light transmitting layer. A preferred form of the apparatus includes a pair of rollers mounted adjacent an exit opening for advancing an exposed film unit through the exit opening while simultaneously spreading a processing composition across the photosensitive layer. A coil of opaque material is mounted adjacent the exit opening in position to be engaged and uncoiled by the leading edge of the film unit as it passes through the exit opening. The coil progressively covers portions of the light transmitting layer adjacent to those portions of the film unit which have been treated with the processing composition, thereby preventing further exposure of untreated portions of the photosensitive layer by ambient light which would otherwise be transmitted lengthwise by the light transmitting layer.

45 Claims, 10 Drawing Figures

OPAQUE SHADE

REFERENCE TO RELATED APPLICATION

This application is related to copending application Ser. No. 466,414 filed on even date herewith by J. Amey et al. and entitled Film Catcher.

BACKGROUND OF THE INVENTION

1. Field of the Invention

This invention relates to photographic apparatus of the self-developing type.

2. Description of the Prior Art

Photographic apparatus of the self-developing type are well known and generally comprise, e.g., a camera having a pair of pressure-applying members through which an exposed film unit is advanced while a processing composition is spread across a photosensitive layer of the film unit to initiate formation of a visible image in the film unit. The treated film unit is then advanced to a lighttight chamber wherein it remains for a period of time sufficient for a visible image to be substantially formed therein. Examples of cameras of the foregoing type may be found in U.S. Pat. Nos. 2,873,658; 3,396,647; and 3,537,370. Each of these patents shows a camera having a chamber for receiving at least a portion of a film unit as it is advanced from between a pair of rollers. The chambers in the first two mentioned patents function to prevent further exposure of a treated film unit to the ambient light while the chamber in U.S. Pat. No. 3,537,370 cooperates with a curtain in the form of a coil of opaque sheet material to prevent further exposure of an untreated film unit. In the latter patent, the leading edge of a film unit is adapted to engage a member on an end of the sheet and uncoil the curtain as they move together passed a viewfinder, thereby preventing further exposure of the film unit to light passing through the viewfinder. However, while the foregoing arrangements performed their function well, the chambers added to the overall dimensions of the cameras thereby placing them at an economic disadvantage relative to similar cameras of a more compact design.

Lately, there has been disclosed a family of film units of the self-developing type which can be advanced into the ambient light substantially immediately after the processing composition has been spread across at least a predetermined length of the film unit. One example of this type of film unit is described in U.S. Pat. No. 3,415,644 granted to Edwin H. Land on Dec. 10, 1968. Film units of this type enhance the compactness of cameras with which they are adapted to be used in that the cameras may be designed to advance a section of the film unit which has been treated with a processing composition from the camera while a section of that film unit yet untreated with the processing composition still remains within the camera.

In order for such an arrangement to be possible, the aforementioned film unit includes a relatively thin, substantially light transparent layer or element, which may comprise a polyester, such as a polymeric film derived from ethylene glycol terephthalic acid, or a cellulose derivative such as cellulose triacetate, defining an outside face or surface of the film unit, and a rupturable pod of processing composition that includes an opacifying constituent. During exposure operations image-carrying light rays from the camera's lens pass through the transparent surface layer before impinging upon a photosensitive layer of the film unit. As the film unit is subsequently advanced between a pair of spread rollers and towards the film exit means of the camera, the spread rollers progressively distribute a mass of the processing composition intermediate predetermined layers of the film unit. Thus, those portions of the film unit progressively exposed to ambient light have been treated by the processing composition with its opacifying constituent which precludes ambient light subsequently incident upon the transparent layer and which is actinic to the photosensitive layer from reaching adjacent or underlying sections of the photosensitive layer. Once the diffusion transfer process has been completed, the developed image is viewable through the aforementioned transparent element.

One of the considerations in camera systems of the aforementioned type is a phenomenon generally referred to as "light-piping". More specifically, light-piping comprises ambient light, which is actinic to the photosensitive layer, incident upon any portion of the transparent material exteriorly of the camera during film processing operations being conducted thereby to portions thereof adjacent yet untreated sections of the exposed photosensitive layer of the film unit. Such light rays can cause undesirable "fogging" of those yet untreated sections of the film unit's photosensitive layer.

To understand this phenomenon more clearly, it should be recognized that the aforementioned film unit comprises an opaque dimensionally stable layer or support element positioned on the side of its photosensitive layer opposed from its light transparent layer. Thus, once the processing composition including its opacifying constituent has been spread across the photosensitive layer, that photosensitive layer is protected from ambient light incident upon the film unit which is actinic to the photosensitive layer, and its development process may therefore be completed when the film unit itself is exposed to ambient light. However, in the aforementioned camera arrangement, a treated section of each such film unit is exposed to ambient light while a section thereof remains on the opposite side of the spread rollers within a light protected chamber of the camera and is yet untreated with the processing composition. While at such times ambient light incident upon the transparent layer of the treated section of the film unit cannot pass through the layer of processing composition to adjacent portions of the exposed photosensitive layer, a portion of these light rays may be reflected internally of the light transparent layer and scatter or diffuse lengthwise therealong into the light protected camera chamber until it reaches a point within the light transparent layer in advance of the composition being spread intermediate the film unit's transparent and photosensitive layers. Since there is no opacifying agent intermediate the light transparent layer and the adjacent portion of the exposed photosensitive layer at this point, these light rays, if actinic to the photosensitive layer, will have the effect of further exposing, or "fogging", the yet untreated section of the photosensitive layer.

One solution of this light-piping problem as disclosed in copending U.S. patent application Ser. No. 419,808 by Edwin H. Land entitled NOVEL PRODUCTS AND PROCESSES filed on Nov. 28, 1973 is to include an opacifying pigment in the light transparent or conducting layer itself. Such an opacifying pigment may comprise carbon black particles in such amounts as to offer little resistance to light rays passing therethrough in its relatively thin (thickness) dimension, i.e., so as to not materially impair the ability to expose the photosensitive layer therethrough nor the ability to subsequently view therethrough the final image produced in the image-receiving layer or element. However, at the same time the amount of such pigment is sufficient to substantially preclude ambient light which is actinic to the photosensitive layer from being piped lengthwise through the light transparent layer to sections thereof in advance of the processing composition. In other words, when the camera lens is operative to expose the photosensitive layer, the image-carrying light rays pass through a very thin section of the light transparent element of the film unit and hence the opacifying pigment therein offers little resistance to such light rays. Similarly, the opacifying pigment does not materially affect the ability to view the final image through the transparent layer in which it is retained. However, ambient light rays attempting to pass through the same light transparent layer of the film unit must be light-piped through a much larger distance thereof, i.e., in its lengthwise direction, before reaching untreated portions of the photosensitive layer and hence the opacifying pigment is highly effective in precluding the passage of those light rays which are actinic to the photosensitive layer therethrough.

Aforementioned copending application Ser. No. 419,808 discloses densities of opacifying pigments employed in light transparent layers of particular film units which have proven suitable for resolving the light-piping problem without materially diminishing the quality of the finished photographic print. However, it will be recognized that it is highly desirable to minimize the light resistant characteristic of the film unit's light transparent layer during normal film exposure operations and therefore desirable to minimize the density of the opacifying pigment in the light transparent layer whenever this can readily be accomplished while still precluding the light-piping phenomenon and without compromising the size of the camera structure. It is to this end that one aspect of the present invention is directed.

SUMMARY OF THE INVENTION

The instant invention relates to photographic apparatus and, more particularly, to a camera of the self-developing type especially designed for use with film units which are adapted to be advanced to the exterior of the camera substantially immediately after being treated with a processing composition. The camera includes a chamber for locating and supporting a film unit in position for exposure and, in a preferred embodiment, film-advancing apparatus which is adapted to engage an exposed film unit and advance it between a pair of driven rollers. The rollers are adapted to spread a processing composition between photosensitive and transparent layers of the film unit while simultaneously advancing treated portions of the film unit into the ambient light via an exit opening in the camera. In order to protect the as yet untreated portion of the photosensitive layer of the film unit from being fogged by light being piped or transmitted along the length of the transparent layer, a curtain formed from a resilient opaque material, e.g., Mylar, is mounted adjacent to and preferably in lighttight relation with the exit opening and in the path of travel of the advancing film unit. The curtain is formed such that it has a coiled or rolled configuration when in a non-stressed condition. Means are provided for attaching one end of the coil of opaque material to the camera at a position adjacent the exit opening such that as the leading edge of the exposed film unit passes beyond the bite of the rollers, it engages the curtain and uncoils it as treated portions of the film unit exit into the ambient light. As the curtain uncoils, it progressively covers those portions of the transparent layer emerging from the exit opening thereby preventing any of the ambient light which is actinic to the photosensitive layer from striking the transparent layer and being piped along its length to a position behind the rollers where it would fog the yet untreated portions of the photosensitive layer. At this point, it should be noted that the opacifying pigment in the transparent layer need not be of a density that would preclude all transmission of light along the length of the transparent layer. Its density may only need to be sufficient to stop the light which is actinic to the photosensitive layer after it has travelled along the length of the transparent layer a predetermined distance, e.g., two inches. Accordingly, it can be seen that the transparent layer must be protected from the light as it passes from the exit opening until said predetermined distance has been exceeded. Stated another way, a two inch length of the transparent layer, as measured in the direction of the movement of the film unit from the line between treated and untreated portions of the photosensitive layer, must always be protected from the ambient light until the photosensitive layer has been completely covered by the processing composition. If the transparent layer does not contain any opacifying pigment, the transparent layer must be protected from actinic light until the entire photosensitive layer has been treated, in which case the aforementioned predetermined distance would be substantially equal to the length of the photosensitive layer. After the photosensitive layer has been completely treated with the processing composition, the curtain may be released from engagement with the film unit and returned to substantially its original position in or adjacent to the exit opening. The length that the curtain can be unrolled through is at least equal to the aforementioned predetermined distance and in the preferred embodiment is such that when the curtain has been fully uncoiled, the leading edge of the film unit moves out of engagement with the free end of the curtain. Once the leading edge of the film unit moves out of engagement with the free end of the curtain, it, the curtain, automatically returns to its coiled configuration. This return is accomplished in the preferred embodiment of the invention by the resiliency of the material while in an alternative embodiment a spring is provided.

In an another alternative embodiment of the invention, the apparatus is constructed for use with film units of the type which are adapted to be manually withdrawn from the apparatus. These film units are adapted to be manually removed from the camera by means of exteriorly located pull tabs or leaders thereby obviating the need for relatively expensive film advancing apparatus for advancing the exposed film unit into the bite of the rollers.

An object of the invention is to provide photographic apparatus of the self-developing type which is capable of preventing further exposure of an exposed film unit which has been advanced to a position outside of the apparatus.

Another object of the invention is to provide photographic apparatus of the self-developing type with an extendible opaque light barrier for preventing further exposure of an exposed film unit which has been advanced to a position outside of the apparatus.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
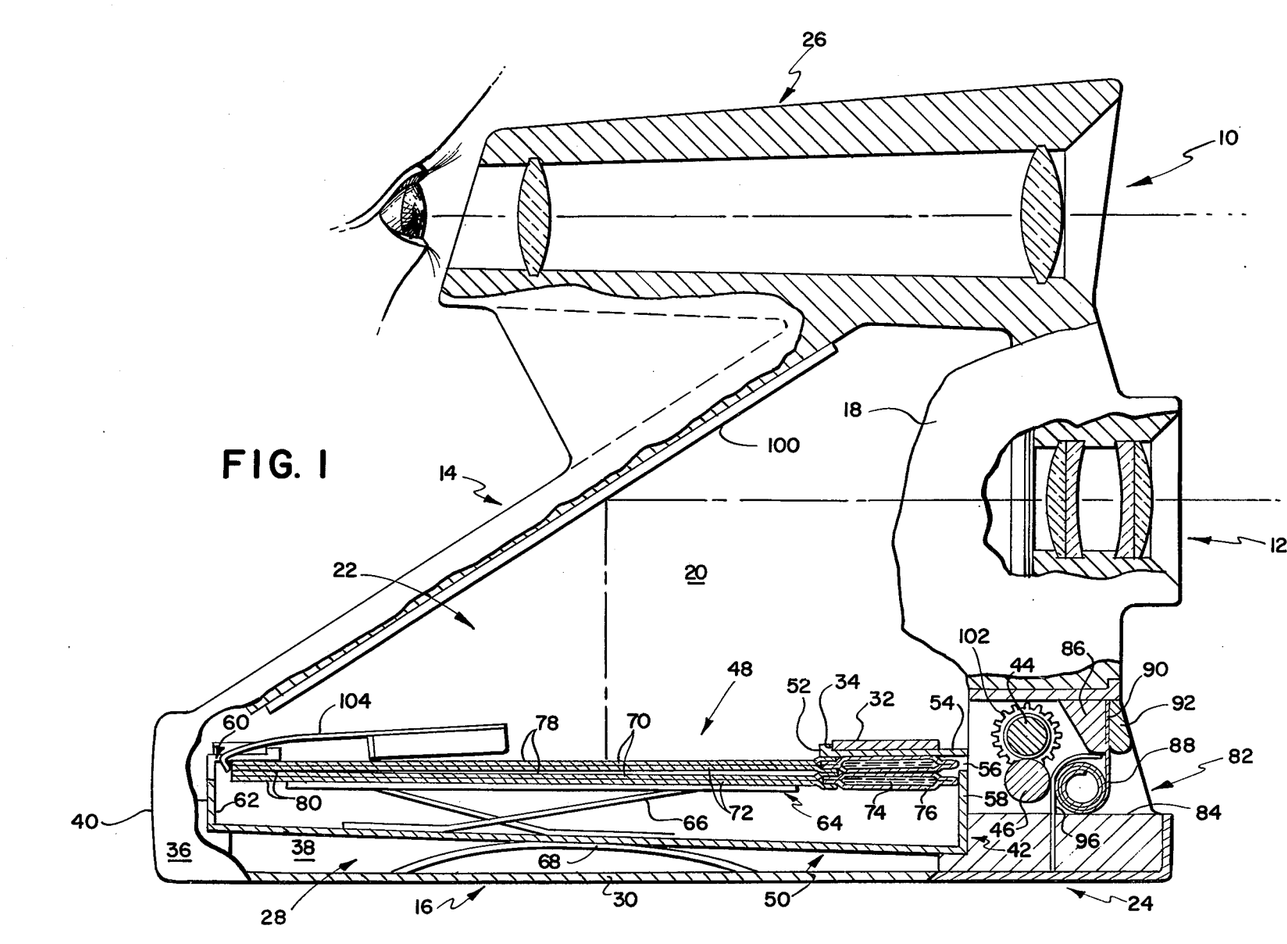
FIG. 1 is an elevational view, partly in section, of photographic apparatus embodying the instant invention.

Reference is now made to FIG. 1 of the drawings wherein is shown photographic apparatus in the form of a self-developing type camera 10. Camera 10 includes a plurality of housing sections 12, 14 and 16 which cooperate with a pair of side walls 18 and 20 to define an exposure chamber 22. Extending forwardly of and pivotally coupled to housing section 16 is a housing 24. Extending upwardly from housing sections 12 and 14 is a conventional viewfinder 26 through which the scene to be photographed may be viewed and/or focused.

Housing section 16 includes an open end chamber 28 defined in part by a bottom wall 30, a platelike member 32 having an exposure aperture 34 therein, side walls 36 and 38 and an end wall 40. Extending across the open end 42 of chamber 38 is a pair of pressure-applying members in the form of rollers 44 and 46. The rollers 44 and 46 are mounted within housing section 24 for movement therewith between the position shown in FIG. 1 and a film loading position wherein housing section 24 has been pivoted clockwise through an angle of approximately ninety degrees to allow a film cassette 48 to be inserted into chamber 28 via opening 42.

The film cassette 48 comprises a container 50 having an exposure opening 52 in a forward wall 54, an elongated opening 56 in leading end wall 58, and a slot 60 in the left-hand portion of forward wall 54 which also extends part way down a trailing end wall 62. Mounted within container 50 are a plurality of film units 64, a platen 66 for resiliently urging the forwardmost film unit into engagement with forward wall 54, preferably a battery (not shown) for providing the energy to operate various components of the camera as is well known in the art, and a conventional dark slide (not shown). A spring 68 mounted on wall 30 of chamber 28 cooperates with forward wall 32 to locate the forwardmost film unit 64 in position for exposure.

The film units 64 are preferably of the type described in the aforementioned U.S. Pat. No. 3,415,644 and are diagrammatically illustrated as including superposed image-receiving and photosensitive systems 70 and 72 between which a processing composition 74, located within a pod 76 attached to leading edges of the image-receiving and photosensitive systems 70 and 72, is adapted to be spread to initiate formation of a visible image in the film unit. Image-receiving system 70 includes a transparent, light transmitting layer 78, preferably formed from Mylar, through which the photosensitive system is exposed, and the rearwardly facing surface of the latter system is provided with an opaque layer 80.

Housing section 24 includes an exit opening 82 defined by spaced members 84 and 86 through which an exposed film unit is adapted to be advanced by rollers 44 and 46. Mounted adjacent exit opening 82 and in lighttight relation therewith is a curtain 88 formed from a generally rectangular sheet of opaque, resilient material, e.g., Mylar, having a thickness of approximately 0.0015 inch and a width substantially equal to that of the film unit. The curtain 88 is preferably formed by wrapping the material around a mandrel and heat treating it such that its normal unstressed configuration will be that of a coil. Alternatively, the material may be coiled, inserted into a metal tube and then heat treated. One end 90 of curtain 88 is suitably secured between members 86 and 92 so as to locate the remainder of the curtain in position to be uncoiled by the leading edge of the film unit as it is being advanced to the exterior of the camera. Also mounted on housing section 24 and extending into engagement with member 86 are a pair of resilient tabs 94 and 96, the function of which will be described hereinafter.

Figures 2, 3, 4, 5:
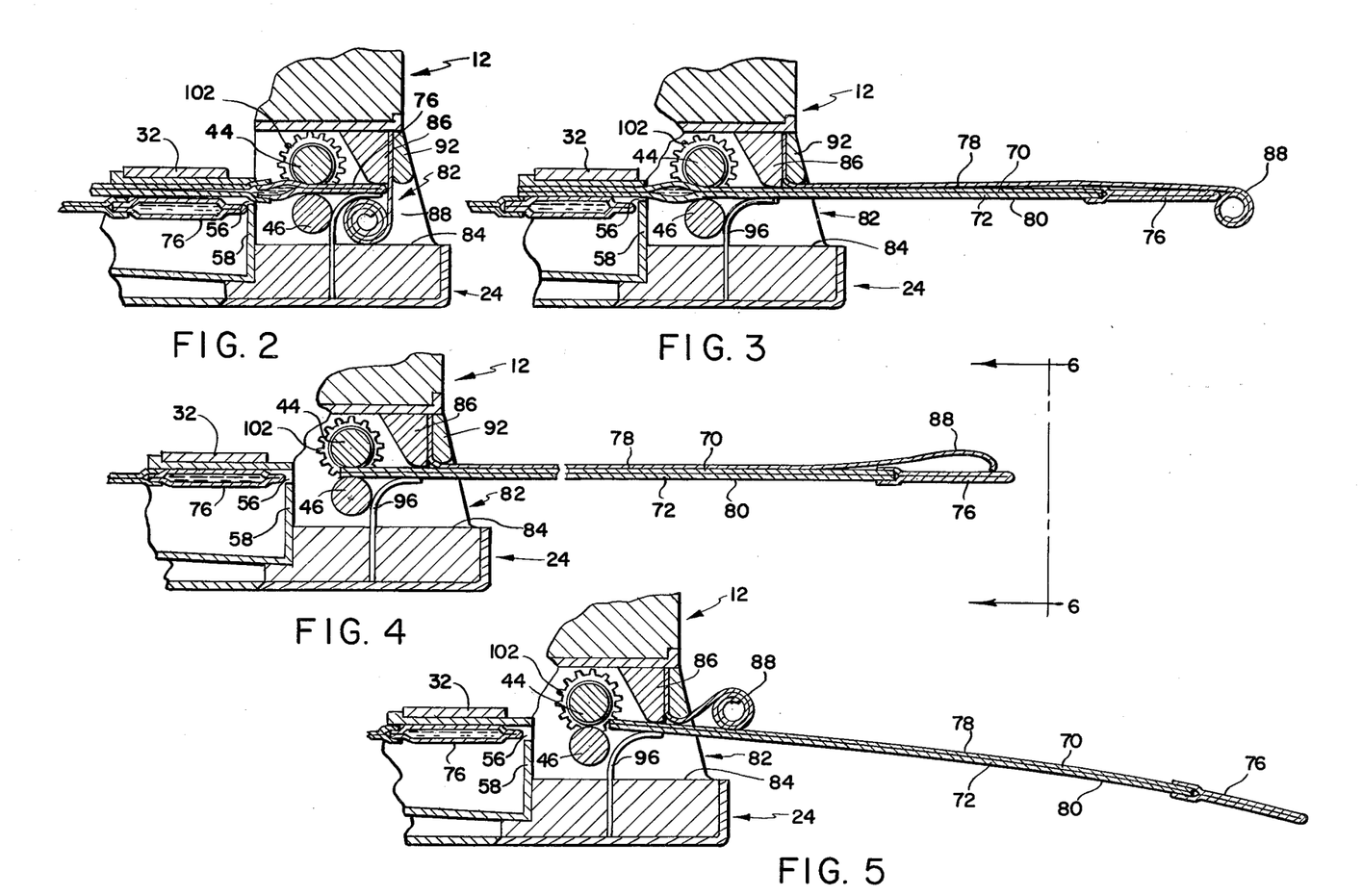
FIGS. 2-5 are sectional views, partly in section, of the apparatus of FIG. 1 diagrammatically illustrating the relationship between an exposed film unit and the apparatus of the invention as the film unit is advanced to a position outside of the apparatus.
Figure 6:
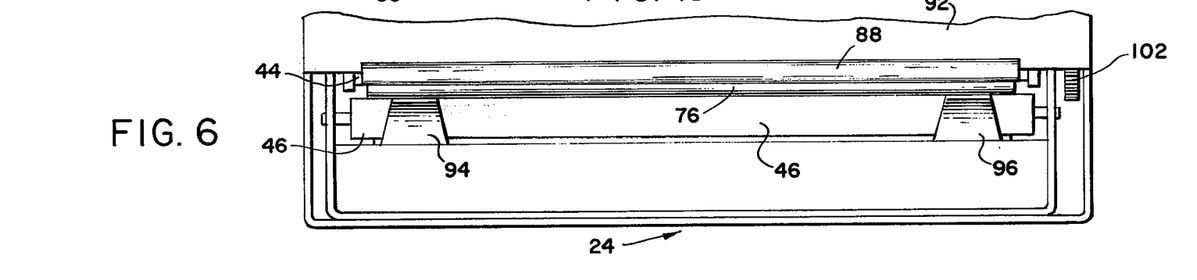
FIG. 6 is a front elevational view of a portion of the apparatus taken generally along the line 6—6 of FIG. 4.

The operator of the camera initiates an exposure cycle by actuation of a start button or switch (not shown). Actuation of the button results in the forwardmost film unit 64 being exposed via light passing through a lens and shutter assembly 98 and being reflected by a mirror 100 onto the photosensitive layer of the film unit. After the exposure, power is transmitted from the camera's motor to a gear 102 attached at one end to roller 44 to rotate the rollers 44 and 46, and to a film advancing apparatus comprising a film engaging member 104 to actuate the latter in a reciprocating manner so as to engage the trailing edge of the exposed film unit and advance it into engagement with the rotating rollers. The rollers continue to advance the exposed film toward the exterior of the camera via exit opening 82 while simultaneously spreading the processing composition 74 across the photosensitive system 72 of the exposed film unit, as shown in FIG. 2. As the leading edge of the exposed film unit leaves the bite of rollers 44 and 46 it first deflects tabs 94 and 96 and then engages curtain 88 and progressively uncoils it, as shown in FIGS. 2 and 3, so as to prevent ambient light from striking those portions of the light transmitting layer 78 overlying the treated portions of the photosensitive system 72 and being piped lengthwise along this layer to portions of the layer overlying untreated portions of the photosensitive system 72 where it may fog the photosensitive system. As shown in FIG. 4, the rollers 44 and 46 continue to advance the exposed film unit until the curtain 88 has been fully uncoiled. At this time the rollers 44 and 46 have substantially completed spreading the processing composition and the trailing edge of the film unit is entering the bite of the rollers. Further advancement of this exposed film unit results in its leading edge moving out of engagement with the free end of the curtain 88 thereby allowing the latter to recoil itself as it moves back toward the exit opening 82. At substantially this time the trailing edge of the film unit moves out of engagement with the rollers 44 and 46 and the film unit is releasably retained by the resilient action of tabs 94 and 96 and the coiled curtain 88, as shown in FIG. 5.

Figure 7:
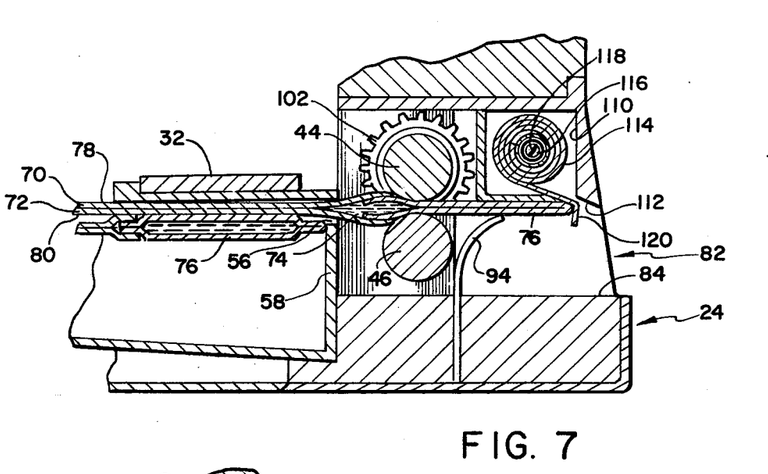
FIG. 7 is a sectional view, partly in section, of an alternative embodiment of the invention.
Figure 8:
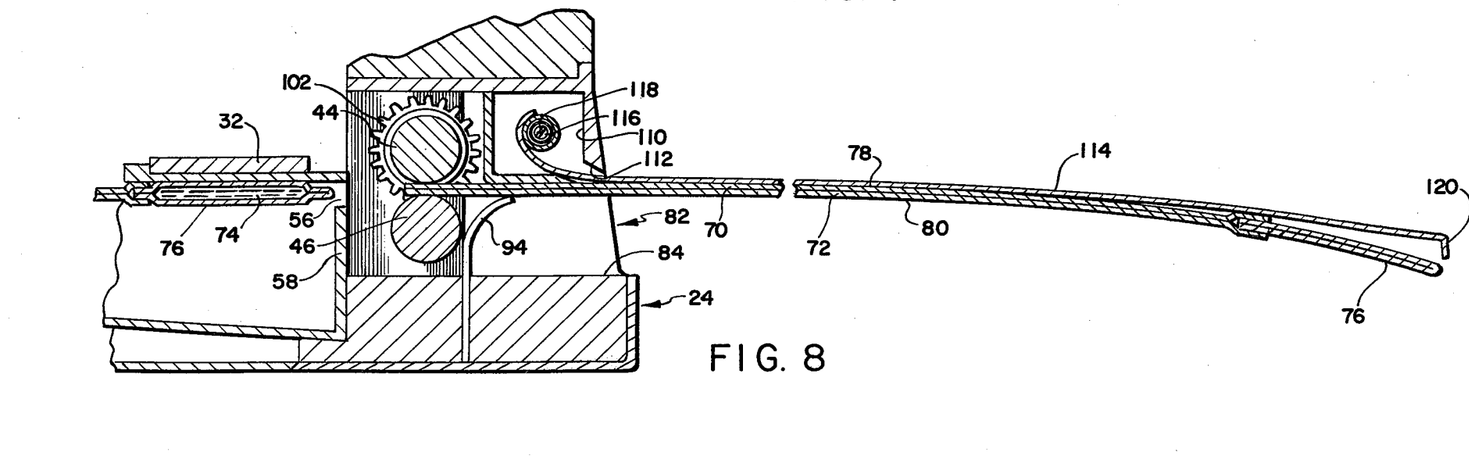
FIG. 8 is a view similar to FIG. 7 showing the film unit of FIG. 7 as it is about to be moved out of engagement with a pair of rollers.

Reference is now made to FIGS. 7 and 8 of the drawings wherein is shown another embodiment of the instant invention. In this embodiment, the roller housing section 24 includes a chamber 110 having an opening 112 therein. Mounted within chamber 110 is a curtain 114 formed from a generally rectangular sheet of opaque material. One end of the curtain 114 is suitably attached to a roller 116 having suitable spring means 118 mounted thereon, much like the conventional window shade. The other end of the curtain 114 is provided with a down-turned lip 120 which is located exteriorly of chamber 118 in position to be engaged by the leading edge of an exposed film unit as it exits from the bite of rollers 44 and 46. As in the previously described preferred embodiment, rollers 44 and 46 advance the exposed film unit toward and through exit opening 82 while simultaneously spreading the processing composition 74 across the photosensitive system 72 of the film unit. As the exposed film unit exits from the bite of the rollers, its leading edge deflects tabs 94 and 96 and then engages lip 120 and gradually uncoils the curtain 114 so as to progressively cover all portions of the light transmitting layer 78 as the film unit leaves the camera thereby preventing any light, which is actinic to the photosensitive system 72, from being piped or transmitted by portions of layer 78 which are to the right of rollers 44 and 46 to portions of layer 78 which are to the left of the rollers. As the curtain 114 is uncoiled, relative rotational motion between roller 116 and spring means 118 results in the latter being progressively tensioned. The advancing film unit continues to uncoil the curtain 114 until substantially its entire length has been run out. At this point, the trailing end of the film unit is about to leave the bite of rollers 44 and 46 and further advancement of the film unit results in the leading edge of the film unit moving out of engagement with lip 120, as shown in FIG. 8. Spring means 118 now recoils the curtain 114 back towards its original position where it cooperates with tabs 94 and 96 to releasably retain the trailing end of the film unit in much the same manner as shown in FIG. 5.

Figure 9:
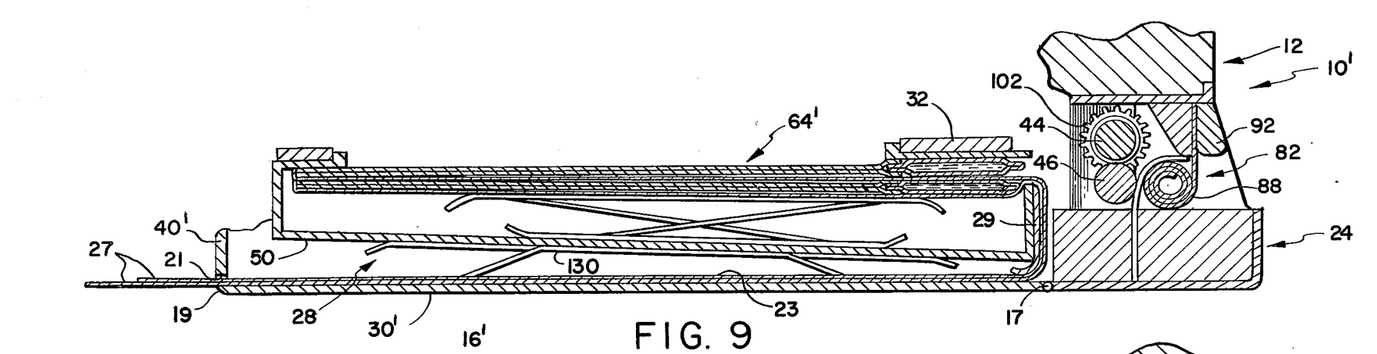
FIGS. 9 and 10 are side elevational views showing still another embodiment of the instant invention.
Figure 10:
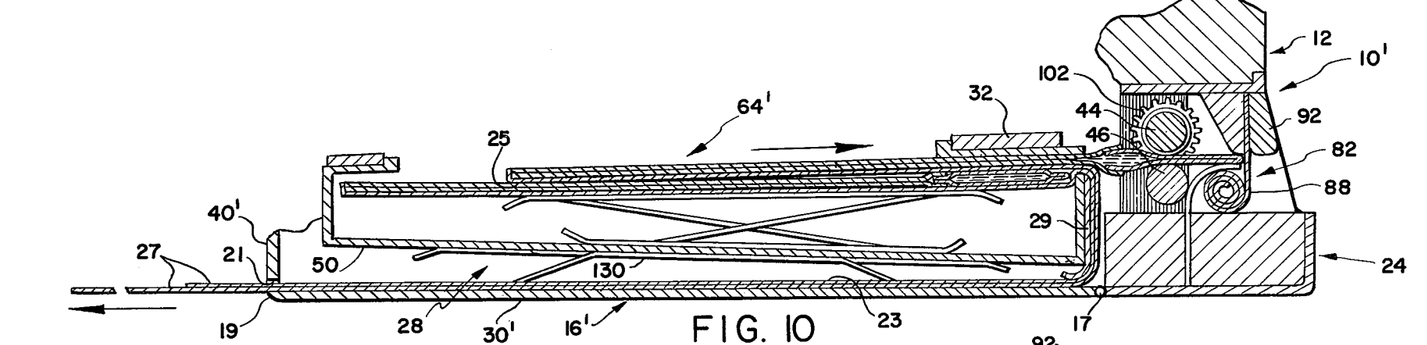

Reference is now made to FIGS. 9 and 10 of the drawings wherein is shown still another embodiment of the invention. In this embodiment the camera 10' is substantially identical to the camera 10 described in FIGS. 1–6 except for the absence of any film engaging member 104 and for a modified housing section 16'. Housing section 16' includes a rear wall 30' suitably hinged at 17 for counterclockwise rotation to a film cassette loading position. A pair of biasing springs 130 (only one of which is shown) are mounted at opposite lateral sides of wall 30' for urging a film cassette 50 against member 32. One end 19 of wall 30' cooperates with a trailing end wall 40' to provide an aperture 21 through which a leader attached to a film unit may be withdrawn. Each of the film units 64' is substantially identical to the film units 64 previously described except for the addition of a leader 23. Each leader 23 is detachably secured, e.g., by an adhesive, at one end 25 to the opaque layer 80 near the trailing end (to the left as viewed in FIGS. 9 and 10) of the film unit. The opposite end 27 of each leader extends around a guide member 29, between biasing springs 130 and through aperture 21 to the exterior of the camera. After the forwardmost film unit 64' has been exposed, the photographer grasps the end 27 of the lowermost leader 23 and pulls it to the left thereby resulting in the exposed film unit being manually advanced into engagement with the rotating rollers 44 and 46. Rollers 44 and 46 continue to advance the exposed film unit to the exterior of the camera as described hereinbefore with reference to the embodiment described in FIGS. 1–6. Leader 23 eventually is detached from the film unit either by being stripped away from the film unit by the opposing forces of the rollers and the photographer or, as is well known in the art, is detached from the film unit when the force being directed along the leader is substantially perpendicular to its point of attachment to the film unit. Although the leader 23 has been described as being releasably secured near the trailing end of the film unit, it should be understood that its point of attachment may be at any point thereon so long as it advances the leading end of the film unit into the bite of the rollers.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for processing an exposed film unit of the type including a plurality of superposed layers including photosensitive and transparent layers, and a processing composition including an opacifying agent which is adapted to be spread across the photosensitive layer comprising:

means for supporting the film unit in position for exposure of the photosensitive layer;

means for advancing the film unit subsequent to exposure away from said exposure position;

pressure-applying means including a pair of juxtaposed members between which the exposed film unit is adapted to be advanced leading edge first during spreading of the processing composition;

means defining an exit opening located forwardly of said pressure-applying means through which the film unit is adapted to be advanced to the exterior of said photographic apparatus; and opaque means mounted adjacent said exit opening for movement between non-extended and extended positions, said opaque means being movable toward said extended position with the leading edge of the film unit as it passes through said exit opening for covering in lighttight relation at least a predetermined area of the transparent layer as it passes from said exit opening sufficient to prevent ambient actinic light from being transmitted by portions of the transparent layer forward of said pressure-applying means to portions of the transparent layer rearwardly of said pressure-applying means, and toward said non-extended position while the predetermined area remains outside said photographic apparatus for progressively exposing the predetermined area to the ambient light.

2. Photographic apparatus as defined in claim 1 further including means for mounting said opaque means in the path of travel of the film unit as the film unit moves from between the pressure-applying means such that the leading edge of the film unit engages said opaque means and progressively extends said opaque means in lighttight relation with at least said predetermined area of the transparent layer as the latter passes through said exit opening.

3. Photographic apparatus as defined in claim 1 further including means for mounting said opaque means in lighttight relation to said exit opening.

4. Photographic apparatus as defined in claim 2 wherein said opaque means extends across said exit opening in lighttight relation therewith when said opaque means is in a non-extended condition.

5. Photographic apparatus as defined in claim 4 wherein said opaque means comprises a coil of resilient material one end of which is secured adjacent said exit opening by said mounting means.

6. Photographic apparatus as defined in claim 1 wherein said opaque means comprises a coil of resilient material and said photographic apparatus further includes means for mounting said coil of resilient material in position to be at least partially uncoiled by the leading edge of the film unit through a predetermined distance.

7. Photographic apparatus as defined in claim 6 further including means for returning said opaque means to said non-extended position after said pressure-applying means have advanced the leading edge of the film unit a distance greater than said predetermined distance.

8. Photographic apparatus as defined in claim 7 wherein said returning means includes a spring.

9. Photographic apparatus as defined in claim 7 wherein said pressure-applying means includes at least one roller.

10. Photographic apparatus as defined in claim 2 wherein said opaque means comprises a sheet of resilient material formed to assume a coiled configuration when in said non-extended position and adapted to be uncoiled through a distance less than that which the leading edge of the film unit moves past said exit opening whereby said opaque means moves out of engagement with the leading edge of the film unit and automatically returns to said coiled configuration in said non-extended position when the leading edge of the film unit has been advanced past said exit opening a distance greater than the distance said opaque means has been coiled.

11. Photographic apparatus as defined in claim 10 wherein said pressure-applying means includes at least one roller.

12. Photographic apparatus as defined in claim 1 wherein said opaque means includes means for returning said opaque means to said non-extended position from said extended position after the leading edge of the film unit has travelled a predetermined distance past said exit opening.

13. Photographic apparatus as defined in claim 12 wherein said pressure-applying means includes at least one roller.

14. Photographic apparatus for processing an exposed film unit of the type including a plurality of superposed layers including photosensitive and transparent layers, and a processing composition including an opacifying agent which is adapted to be spread across the photosensitive layer comprising:
   means for supporting the film unit in position for exposure of the photosensitive layer;
   means for advancing the film unit subsequent to exposure away from said exposure position;
   pressure-applying means including a pair of juxtaposed members between which the exposed film unit is adapted to be advanced leading edge first during spreading of the processing composition;
   means defining an exit opening through which the film unit is adapted to be advanced to the exterior of said photographic apparatus; and
   opaque means mounted adjacent said exit opening for sequential movement from a first position wherein said opaque means is in lighttight relation with said exit opening to a second position wherein it is in lighttight relation with the transparent layer of the film unit as it passes from said exit opening to the exterior of said photographic apparatus and then back toward said first position while a major portion of the film unit remains outside said photographic apparatus.

15. Photographic apparatus as defined in claim 14 wherein said opaque means comprises a sheet of opaque material adapted to assume a coiled configuration when in said first position and a substantially flat configuration when in said second position.

16. Photographic apparatus as defined in claim 15 wherein said sheet of opaque material includes a resilient property for automatically returning said opaque sheet to said coiled configuration when in an unstressed condition.

17. Photographic apparatus as defined in claim 16 wherein said opaque sheet is mounted in position to be uncoiled by the leading edge of the film unit as it passes from said exit opening.

18. Photographic apparatus as defined in claim 17 wherein said opaque sheet is adapted to be uncoiled through a predetermined distance by the leading edge of the film unit, said predetermined distance being less than the length of the film unit whereby said opaque sheet automatically returns to said first position before the film unit passes completely through said exit opening.

19. Photographic apparatus for processing an exposed film unit of the type including a plurality of superposed layers including photosensitive and transparent layers, and a processing composition including an opacifying agent which is adapted to be spread across the photosensitive layer comprising:
   means for supporting the film unit in position for exposure of the photosensitive layer;
   means for advancing the film unit subsequent to exposure away from said exposure position;
   pressure-applying means including a pair of juxtaposed members between which the exposed film unit is adapted to be advanced leading edge first during spreading of the processing composition;
   means defining an exit opening through which the exposed film unit is adapted to be advanced to the exterior of said photographic apparatus;
   opaque means movable with the leading edge of the film unit a predetermined distance for covering the transparent layer of the film unit as it passes through said exit opening; and means for uncovering the transparent layer while the transparent layer remains outside said photographic apparatus so as to expose it to the ambient light when said predetermined distance has been reached by said opaque means.

20. Photographic apparatus as defined in claim 19 wherein said means for uncovering the transparent layer includes a spring.

21. Photographic apparatus for processing an exposed film unit of the type including a plurality of superposed layers including photosensitive and transparent layers, and a processing composition including an opacifying agent which is adapted to be spread across the photosensitive layer comprising:

means for supporting the film unit in position for exposure of the photosensitive layer;

pressure-applying means including a pair of juxtaposed members between which the film unit is adapted to be advanced, subsequent to exposure, leading edge first during spreading of the processing composition;

means defining an exit opening located forwardly of said pressure-applying means through which the film unit is adapted to be advanced to the exterior of said photographic apparatus; and opaque means mounted adjacent said exit opening for movement between non-extended and extended positions, said opaque means being movable toward said extended position with the leading edge of the film unit as it passes through said exit opening for covering in lighttight relation at least a predetermined area of the transparent layer as it passes from said exit opening sufficient to prevent ambient actinic light from being transmitted by portions of the transparent layer forward of said pressure-applying means to portions of the transparent layer rearwardly of said pressure-applying means, and toward said non-extended position while the predetermined area remains outside said photographic apparatus for progressively exposing the predetermined area to the ambient light.

22. Photographic apparatus as defined in claim 21 further including means for mounting said opaque means in the path of travel of the film unit as the film unit moves from between the pressure-applying means such that the leading edge of the film unit engages said opaque means and progressively extends said opaque means in lighttight relation with at least said predetermined area of the transparent layer as the latter passes through said exit opening.

23. Photographic apparatus as defined in claim 21 further including means for mounting said opaque means in lighttight relation to said exit opening.

24. Photographic apparatus as defined in claim 22 wherein said opaque means extends across said exit opening in lighttight relation therewith when said opaque means is in a non-extended condition.

25. Photographic apparatus as defined in claim 24 wherein said opaque means comprises a coil of resilient material one end of which is secured adjacent said exit opening by said mounting means.

26. Photographic apparatus as defined in claim 21 wherein said opaque means comprises a coil of resilient material and said photographic apparatus further includes means for mounting said coil of resilient material in position to be at least partially uncoiled by the leading edge of the film unit through a predetermined distance.

27. Photographic apparatus as defined in claim 26 further including means for returning said opaque means to said non-extended position after said pressure-applying means have advanced the leading edge of the film unit a distance greater than said predetermined distance.

28. Photographic apparatus as defined in claim 27 wherein said returning means includes a spring.

29. Photographic apparatus as defined in claim 27 wherein said pressure-applying means includes at least one roller.

30. Photographic apparatus as defined in claim 22 wherein said opaque means comprises a sheet of resilient material formed to assume a coiled configuration when in said non-extended position and adapted to be uncoiled through a distance less than that which the leading edge of the film unit moves past said exit opening whereby said opaque means moves out of engagement with the leading edge of the film unit and automatically returns to said coiled configuration in said non-extended position when the leading edge of the film unit has been advanced past said exit opening a distance greater than the distance said opaque means has been uncoiled.

31. Photographic apparatus as defined in claim 30 wherein said pressure-applying means includes at least one roller.

32. Photographic apparatus as defined in claim 21 wherein said opaque means includes means for returning said opaque means to said non-extended position from said extended position after the leading edge of the film unit has travelled a predetermined distance past said exit opening.

33. Photographic apparatus as defined in claim 32 wherein said pressure-applying means includes at least one roller.

34. Photographic apparatus for processing an exposed film unit of the type including a plurality of superposed layers including photosensitive and transparent layers, and a processing composition including an opacifying agent which is adapted to be spread across the photosensitive layer comprising:

means for supporting the film unit in position for exposure of the photosensitive layer;

pressure-applying means including a pair of juxtaposed members between which the film unit is adapted to be advanced, subsequent to exposure, leading edge first during spreading of the processing composition;

means defining an exit opening through which the film unit is adapted to be advanced to the exterior of said photographic apparatus; and opaque means mounted adjacent said exit opening for sequential movement from a first position wherein said opaque means is in lighttight relation with said exit opening to a second position wherein it is in lighttight relation with the transparent layer of the film unit as it passes from said exit opening to the exterior of said photographic apparatus and then back toward said first position while a major portion of the film unit remains outside said photographic apparatus.

35. Photographic apparatus as defined in claim 34 wherein said opaque means comprises a sheet of opaque material adapted to assume a coiled configuration when in said first position and a subsequently flat configuration when in said second position.

36. Photographic apparatus as defined in claim 35 wherein said sheet of opaque material includes a resilient property for automatically returning said opaque sheet to said coiled configuration when in an unstressed condition.

37. Photographic apparatus as defined in claim 36 wherein said opaque sheet is mounted in position to be uncoiled by the leading edge of the film unit as it passes from said exit opening.

38. Photographic apparatus as defined in claim 37 wherein said opaque sheet is adapted to be uncoiled through a predetermined distance by the leading edge of the film unit, said predetermined distance being less than the length of the film unit whereby said opaque sheet automatically returns to said first position before the film unit passes completely through said exit opening.

39. Photographic apparatus for processing an exposed film unit of the type including a plurality of superposed layers including photosensitive and transparent layers, and a processing composition including an opacifying agent which is adapted to be spread across the photosensitive layer comprising:
  means for supporting the film unit in position for exposure of the photosensitive layer;
  pressure-applying means including a pair of juxtaposed members between which the film unit is adapted to be advanced, subsequent to exposure, leading edge first during spreading of the processing composition;
  means defining an exit opening through which the exposed film unit is adapted to be advanced to the exterior of said photographic apparatus;
  opaque means movable with the leading edge of the film unit a predetermined distance for covering the transparent layer of the film unit as it passes through said exit opening; and
  means for uncovering the transparent layer while the transparent layer remains outside said photographic apparatus so as to expose it to the ambient light when said predetermined distance has been reached by said opaque means.

40. Photographic apparatus as defined in claim 39 wherein said means for uncovering the transparent layer includes a spring.

41. Photographic apparatus for processing an exposed film unit including a pod of processing fluid located adjacent a leading edge thereof and arranged to release the processing fluid retained therein responsive to a compressive force being exerted thereagainst, the film unit further including a photosensitive layer and a light transparent layer overlying one side of the photosensitive layer, said apparatus comprising:
  a housing formed of opaque material, said housing being configured to retain at least one of the exposed film units at a given position and to define an opening through which the film unit may be advanced from said housing;
  a pair of elongated juxtaposed members located intermediate said given position within said housing and said opening and arranged to first exert a compressive force on the pod to release the processing fluid retained therein and then to subsequently direct the released processing fluid progressively over the photosensitive layer responsive to the exposed film unit being advanced from its said given position within said housing through said opening; and
  means for at least substantially protecting the light transparent layer from ambient light rays as the film unit emerges from said housing through said opening, said means including an extendable opaque member mounted on said housing and structured and arranged to be stored in an initial compact non-extended position and to be engaged by the leading edge of the film unit and progressively automatically extended therefrom to overlie the transparent layer as the film unit emerges from said housing through said opening and to automatically return to said compact non-extended position upon disengagement of said extendable opaque member from the film unit while the film unit remains outside said housing so as to expose the transparent layer to ambient light rays.

42. The apparatus of claim 41 in which said opaque member is flexible and coiled when in its said initial compact non-extended position and progressively uncoiled from its initial position to overlie the film unit's transparent layer as the film unit emerges from said housing through said opening.

43. The apparatus of claim 41 wherein said opaque member is further configured to be automatically released from the leading edge of the film unit after a predetermined length of the film unit has been transported through said opening.

44. The apparatus of claim 41 wherein said means includes means for automatically returning said opaque member to its said initial compact non-extended position at a predetermined time following the emergence of the film unit's leading edge from said opening, thereby leaving the light transparent layer of the film unit fully exposed to ambient light rays.

45. Photographic apparatus for processing an exposed film unit of the type having opposed major surfaces and including a pod of processing fluid arranged to release the processing fluid retained therein along a photosensitive layer in response to a compressive force being exerted thereagainst, said apparatus comprising:
  a housing formed of opaque material, said housing being configured to retain at least one of the exposed film units at a given position and to define an opening through which the film unit may be advanced from said housing;
  a pair of elongated juxtaposed members located intermediate said given position within said housing and said opening and arranged to first exert a compressive force on the pod to release the processing fluid retained therein and then to subsequently direct the released processing fluid progressively over the film unit's photosensitive layer responsive to the exposed film unit being advanced from its said given position within said housing through said opening; and
  means for at least substantially protecting a major surface of the film unit from ambient light rays as the film unit emerges from said housing through said opening, said means including an extendable opaque member mounted from said housing and structured and arranged to be automatically progressively extended from said housing to overlie at least one major surface of the film unit as the film unit is advanced a predetermined distance outward of said opening, and to be automatically returned to its unextended position while the major surface of the film unit remains outside said housing in response solely to said film unit being advanced further so as to expose the major surface to ambient light outwardly of said opening.

* * * * *